United States Patent [19]
Hill

[11] Patent Number: 5,368,209
[45] Date of Patent: Nov. 29, 1994

[54] VEHICLE CARGO ATTACHMENT SUPPORT

[76] Inventor: Norman L. Hill, 10900 Hwy 41 N., Dillon, Mont. 59725

[21] Appl. No.: 138,721

[22] Filed: Oct. 20, 1993

[51] Int. Cl.⁵ .................................................. B60R 9/00
[52] U.S. Cl. ............................... 224/42.44; 224/42.43; 280/415.1; 280/30; 280/769
[58] Field of Search ............... 224/42.44, 42.43, 42.01, 224/42.07, 42.08, 42.45 R; 280/415.1, 639, 30, 769

[56] References Cited
U.S. PATENT DOCUMENTS 2,879,072  3/1959  Rear et al. ............................ 280/639
4,744,590  5/1988  Chesney ............................ 224/42.08
4,938,399  7/1990  Hull et al. ............................ 224/42.43
5,018,651  5/1991  Hull et al. ............................ 224/42.08

*Primary Examiner*—Linda J. Sholl
*Attorney, Agent, or Firm*—E. Michael Combs

[57] ABSTRACT

A rectilinear frame mounting a floor within the frame includes a first mounting tube extending from the frame relative to a forward leg of the frame, with the rear leg of the frame integrally mounting a second mounting tube orthogonally oriented relative to the first mounting tube permitting ease of storage of the frame by the second mounting tube or use of the frame by use of the first mounting tube.

4 Claims, 4 Drawing Sheets

VEHICLE CARGO ATTACHMENT SUPPORT

BACKGROUND OF THE INVENTION

1. Field of the Invention

The field of invention relates to cargo support attachment structure, and more particularly pertains to a new and improved vehicle cargo attachment support wherein the same is arranged for providing a platform to permit support and transport of cargo relative to an associated vehicle.

2. Description of the Prior Art

Accessory cargo transport structure is indicated in the prior art and exemplified by the U.S. Pat. Nos. 5,038,983; 4,938,399; 4,813,584; and 5,067,640.

The instant invention provides for a cargo transport structure arranged for ease of orientation in a vertical orientation relative to a vehicle receiver tube or parallel to the receiver tube in use of the frame structure in a transport mode relative to the vehicle and in this respect, the present invention substantially fulfills this need.

SUMMARY OF THE INVENTION

In view of the foregoing disadvantages inherent in the known types of vehicle transport structure now present in the prior art, the present invention provides a vehicle cargo attachment support wherein the same is arranged for ease of transport of cargo relative to an associated vehicle. As such, the general purpose of the present invention, which will be described subsequently in greater detail, is to provide a new and improved vehicle cargo attachment support which has all the advantages of the prior art vehicle cargo transport structure and none of the disadvantages.

To attain this, the present invention provides a rectilinear frame mounting a floor within the frame, including a first mounting tube extending from the frame relative to a forward leg of the frame, with the rear leg of the frame integrally mounting a second mounting tube orthogonally oriented relative to the first mounting tube permitting ease of storage of the frame by the second mounting tube or use of the frame by use of the first mounting tube.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle cargo attachment support which has all the advantages of the prior art vehicle cargo transport apparatus and none of the disadvantages.

It is another object of the present invention to provide a new and improved vehicle cargo attachment support which may be easily and efficiently manufactured and marketed.

It is a further object of the present invention to provide a new and improved vehicle cargo attachment support which is of a durable and reliable construction.

An even further object of the present invention is to provide a new and improved vehicle cargo attachment support which is susceptible of a low cost of manufacture with regard to both materials and labor, and which accordingly is then susceptible of low prices of sale to the consuming public, thereby making such vehicle cargo attachment supports economically available to the buying public.

Still yet another object of the present invention is to provide a new and improved vehicle cargo attachment support which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
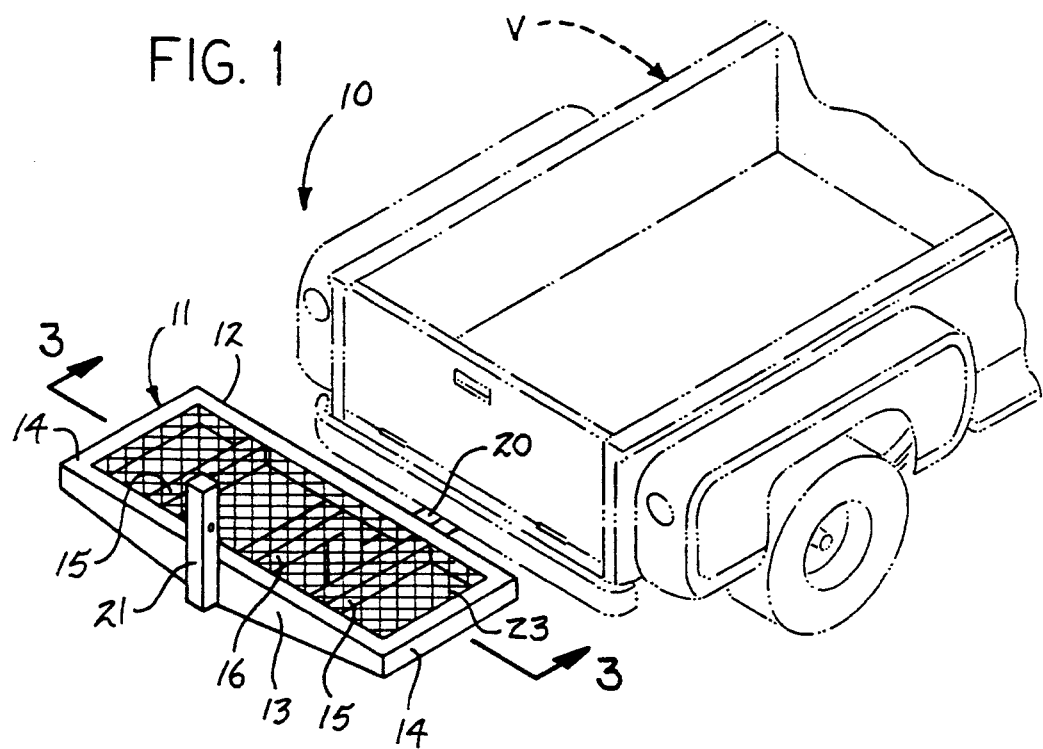
FIG. 1 is an isometric illustration of the invention.
Figure 2:
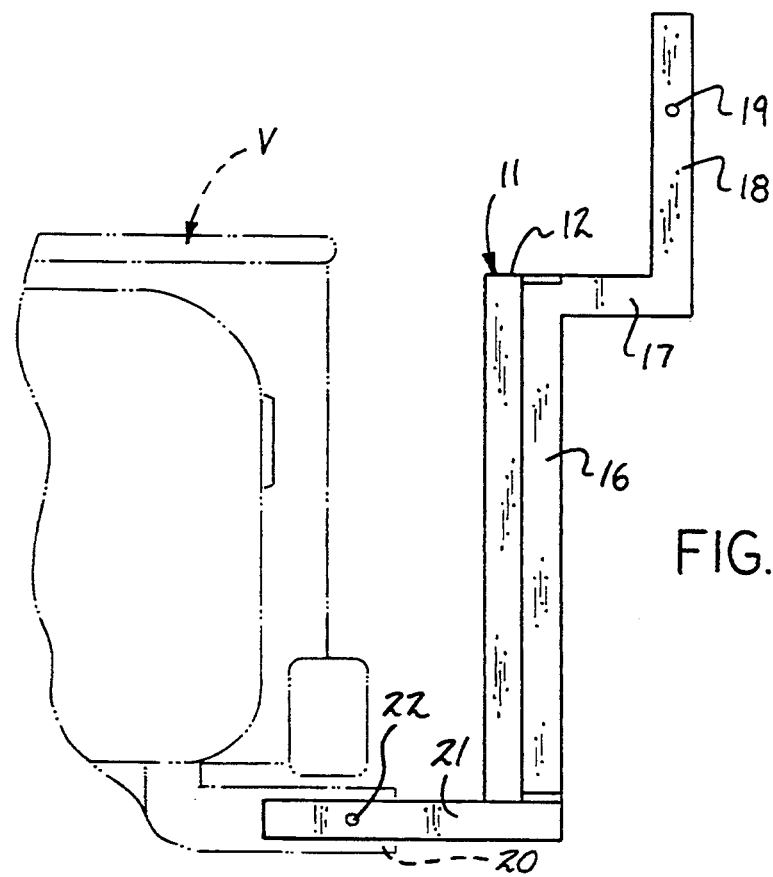
FIG. 2 is an orthographic side view of the invention oriented in a storage orientation relative to the vehicle in a second position relative to the first position as illustrated in FIG. 1.
Figure 3:
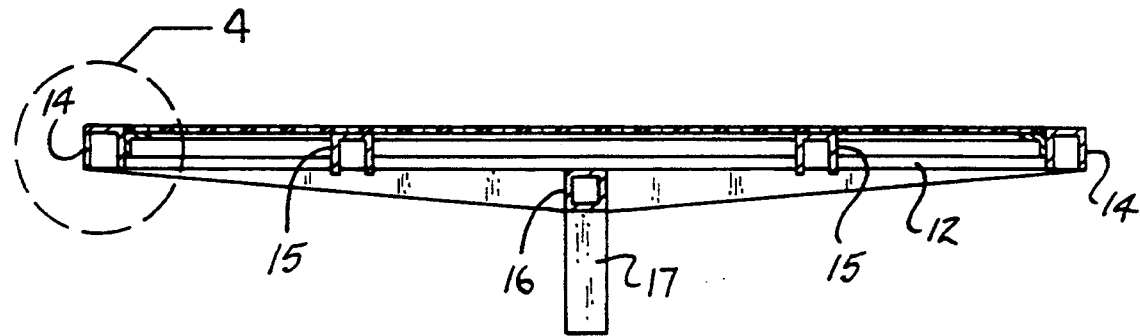
FIG. 3 is an orthographic view, taken along the lines 3—3 of FIG. 1 in the direction indicated by the arrows.
Figure 4:
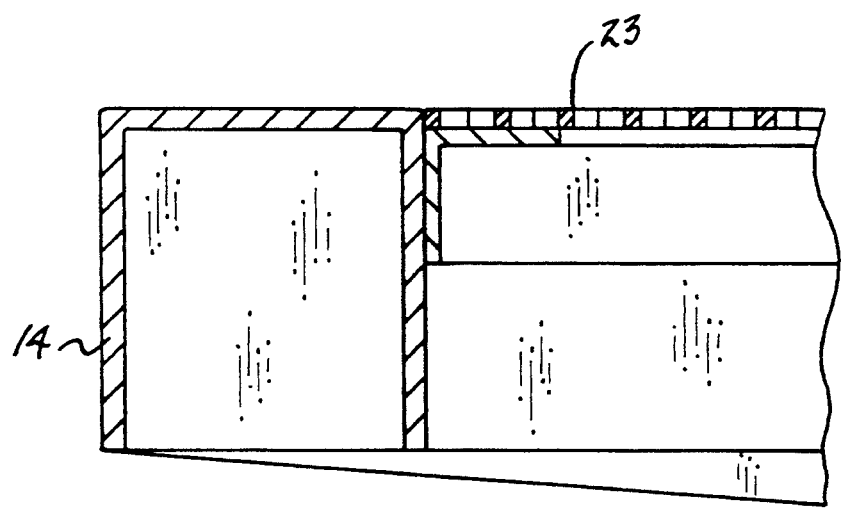
FIG. 4 is an enlarged orthographic view of section 4 as set forth in FIG. 3.

With reference now to the drawings, and in particular to FIGS. 1 to 8 thereof, a new and improved vehicle cargo attachment support embodying the principles and concepts of the present invention and generally designated by the reference numeral 10 will be described.

More specifically, the vehicle cargo attachment support 10 of the instant invention essentially comprises a rigid rectilinear frame, having a front leg 12 spaced from a rear leg 13, and spaced side legs 14 mounting intermediate the framework and coextensive therewith a frame floor 23 as indicated, formed of mesh construction for reduction in weight, but it is understood that a solid floor may be utilized in lieu of the mesh construction as illustrated. Spaced reinforcing legs 15 extend orthogonally between the front and rear legs 12 and 13, with a central leg 16 fixedly mounted between the front and rear legs oriented medially of the reinforcing legs 15. The central leg 16 includes an extension leg 17 orthogonally oriented relative to the central leg and to the rectilinear frame 11 extending below the rectilinear frame and having a first mounting tube 18 orthogonally and fixedly oriented relative to the extension leg projecting beyond the extension leg for reception within a carrier tube 20 of the associated vehicle "V", such as illustrated in the FIGS. 1 and 2. A second mounting tube 21 fixedly and orthogonally mounted relative to the rear leg 13 is oriented parallel to the extension leg 17, with the second mounting tube extending above the frame 11, as illustrated, to an opposed side of the frame 11 for mounting the frame in a vertical orientation relative to the carrier tube 20 for storage and ease of transport of the organization during periods of non-use. The first mounting tube 8 is formed with a first mounting tube pin receiving bore 19, with the second mounting tube having a second mounting tube pin receiving bore 22 to each receive an associated pin structure, of a type as illustrated in FIG. 7, as the lock pin 29 permits selective securement of the first and second mounting tubes 18 and 2 relative to the carrier tube 20.

Figure 5:
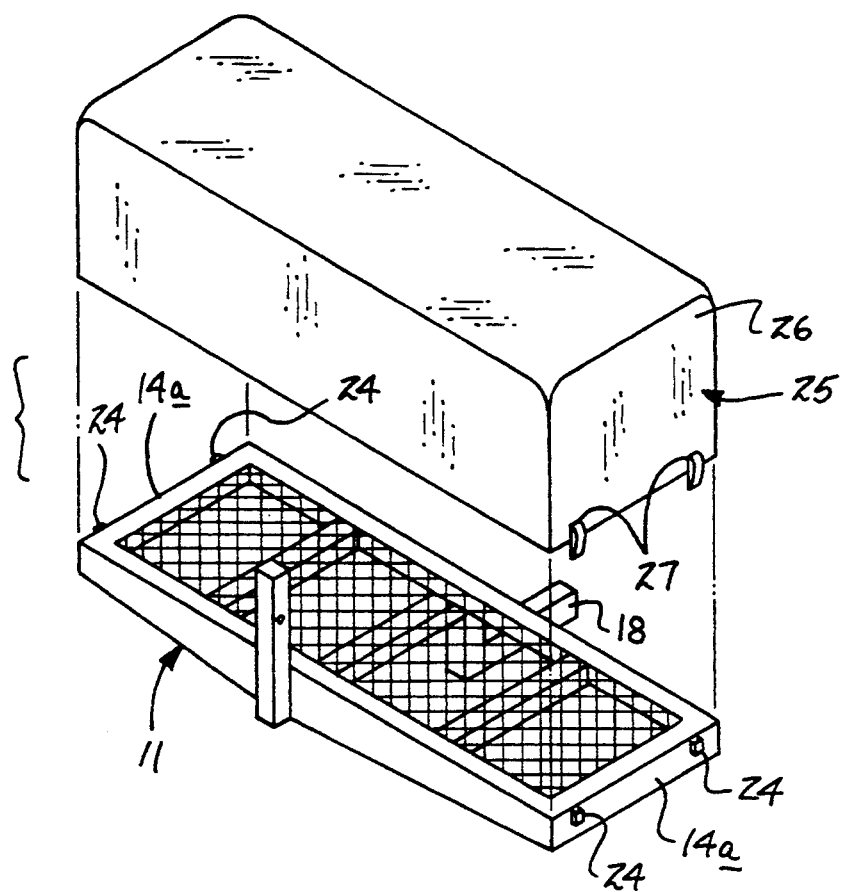
FIG. 5 is an orthographic view of a modified aspect of the invention arranged for transport of a container onto the framework.
Figure 6:
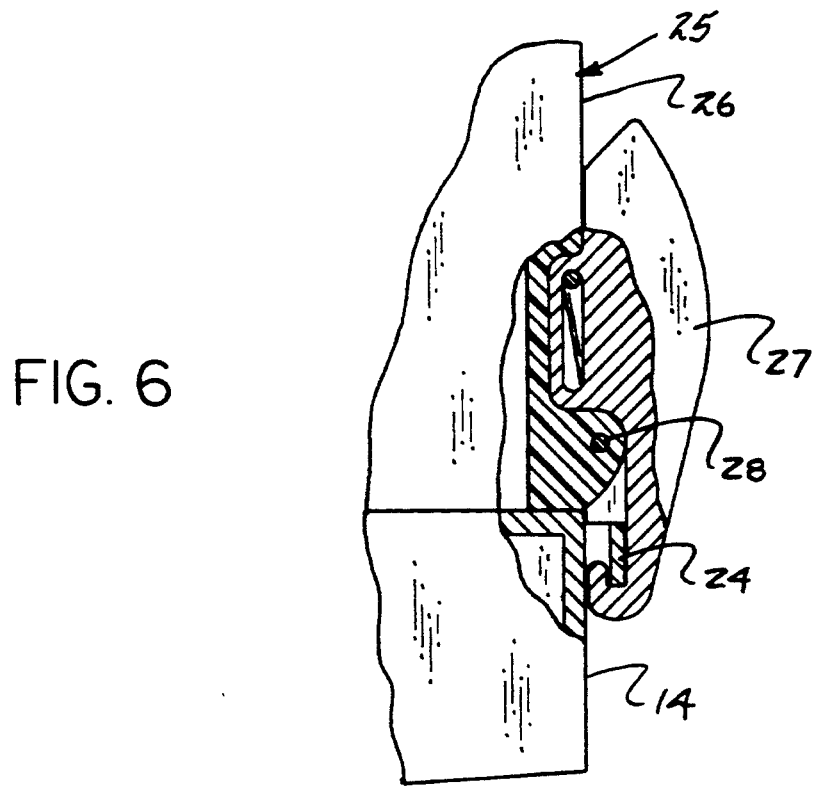
FIG. 6 is an enlarged orthographic view, partially in section, of the latch structure as indicated for use in FIG. 5.

The frame 11, as indicated in FIG. 5, includes modified side legs 14, each including latch flanges 24 cooperative with latch plates 27 pivotally mounted to the side walls 26 of a container cover 25. The container cover is arranged for providing cover protection to cargo positioned upon the frame floor 23. As illustrated in FIG. 6, each of the cover latch plates 27 is pivotally mounted about a cover latch pivot axle 28 to a respective side wall 26, with the associated cover latch plate 27 thereby pivotal about that cover latch pivot axle 28 to permit its engagement with a respective latch flange 24, as illustrated.

Figure 7:
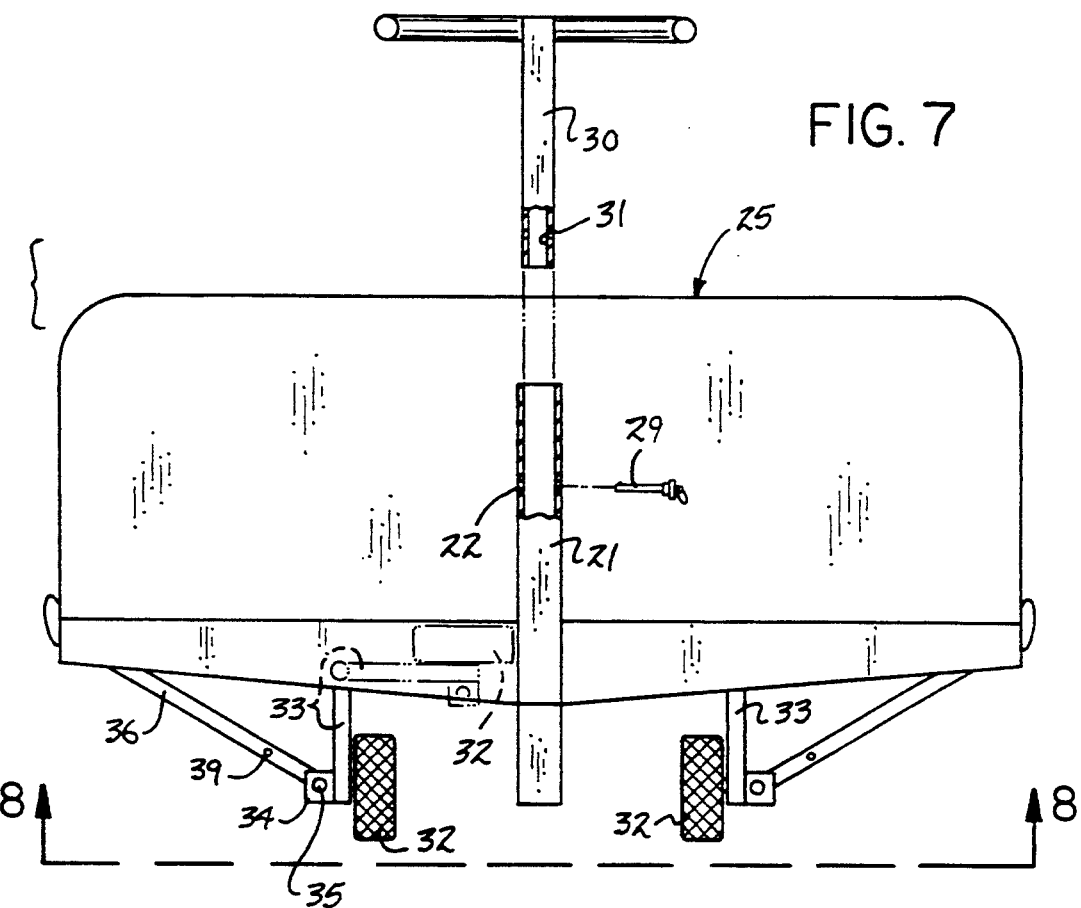
FIG. 7 is an orthographic rear view of a further modified aspect of the invention.
Figure 8:
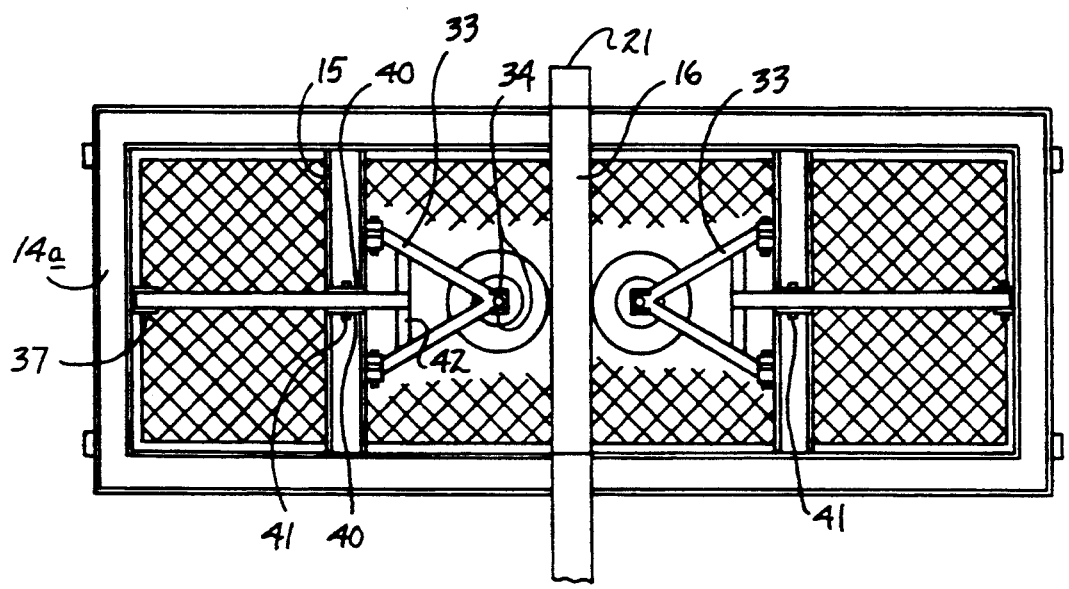
FIG. 8 is an orthographic view, taken along the lines 8—8 of FIG. 7 in the direction indicated by the arrows when the transport wheels are in a stored orientation relative to the framework.

The FIG. 7 indicates that the second mounting tube is arranged to receive a "T" handle 30, with the "T" handle having "T" handle aligned apertures 31 to receive the lock pin 29 through the "T" handle apertures 31 and through the second mounting tube pin receiving bore structure 22. Further, the structure as indicated in FIG. 7 additionally includes wheel members 32, each rotatably mounted to an "A" frame 33. Each "A" frame 33 includes "A" frame spaced flanges 34 at an apex of the "A" frame, such that base of the "A" frame is pivotally mounted each relative to an individual reinforcing leg 15. An "A" frame lock pin 35 is arranged for reception through the "A" frame space flanges 34 and through a forward end of a support leg 36 that has its rear end pivotally mounted to a side leg 14a by the support leg pivot axle 37. A forward end of each support leg 36 is arranged to receive the "A" frame lock pin 35 therethrough when the forward end of the support leg 36 is positioned between the "A" frame space flanges 34. Each support leg 39 also includes a support leg intermediate aperture 39 arranged for reception within reinforcing leg space flanges 40 integrally mounted to an individual one of the reinforcing legs 15, such that during storage of each "A" frame 33, the support leg intermediate aperture 39 is positioned between the reinforcing leg space flanges 40 to receive a reinforcing leg lock pin 41. It should be noted that in the stored position, the support leg extends to abut an "A" frame cross bar 42 maintaining the "A" frame within the rectilinear frame 11 during storage.

In this manner when the legs are in their lowered position, as illustrated in FIG. 7, the rectilinear frame 11 may be transported by use of the "T" handle structure 30.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by Letters Patent of the United States is as follows:

1. A vehicle cargo attachment support, comprising,
a rigid, rectilinear frame having a front leg spaced from a rear leg and spaced side legs, with a frame floor arranged coextensively within the frame, and
a central leg extending orthogonally and coextensively between the front leg and the rear leg, with the central leg including an extension leg orthogonally oriented relative to the central leg at the front leg, with the central leg extending below the rectilinear frame, and the central leg including a first mounting tube fixedly mounted orthogonally to the central leg, with the first mounting tube spaced from and parallel the central leg, with the first mounting tube extending beyond the rectilinear frame, and the first mounting tube having a first mounting tube pin receiving bore, and
a second mounting tube oriented parallel to the extension leg, with the second mounting tube fixedly and orthogonally mounted to the rear leg of the rectilinear frame, with the second mounting tube extending above the rectilinear frame, and the second mounting tube including a second mounting tube pin receiving bore spaced from the rectilinear frame.

2. A support as set forth in claim 1 further including a container cover, the container cover including cover side walls, with each of the cover side walls including cover latch plates, each of the cover latch plates including a latch plate pivotal axle pivotally mounting said each latch plate to the container cover, and each of the frame side legs includes latch flanges cooperative with the latch plates to secure the container cover to the rectilinear frame.

3. A support as set forth in claim 2 including a "T" handle, the "T" handle including a "T" handle body, with the "T" handle body including "T" handle apertures directed therethrough, with the "T" handle apertures arranged for alignment with the "T" handle received within the second mounting tube, with the "T" handle apertures aligned with the second mounting tube pin receiving bore, and a lock pin received through the "T" handle apertures and the second mounting tube pin receiving bore, and the rectilinear frame including spaced reinforcing legs extending orthogonally between the front leg and the rear leg, with the reinforcing legs positioned on opposed sides of the central leg, and each of the reinforcing legs including an "A" frame pivotally mounted thereto, the "A" frame including a base pivotally mounting the "A" frame to a respective one of said reinforcing legs, and the "A" frame including an "A" frame apex, with a wheel member mounted to the "A" frame apex, and the "A" frame including "A" frame spaced flanges, and a support leg, the support leg including a first end pivotally mounted to one of said rectilinear frame side legs, with the support leg having a support leg second end, and the support leg second end arranged for reception within the "A" frame space flanges, with an "A" frame lock pin directed through the "A" frame space flanges and the support leg second end.

4. A support as set forth in claim 3 wherein the support leg includes a support leg intermediate aperture, and each reinforcing leg of said reinforcing legs having a reinforcing leg lock pin to permit reception of the support leg intermediate aperture between the reinforcing leg space flanges when the support leg second is separated from the "A" frame space flanges, and each "A" frame including an "A" frame cross bar, with the "A" frame second end arranged for abutment to the "A" frame cross bar when the support leg is separated from the "A" frame space flanges.

* * * * *